Patented Oct. 25, 1932

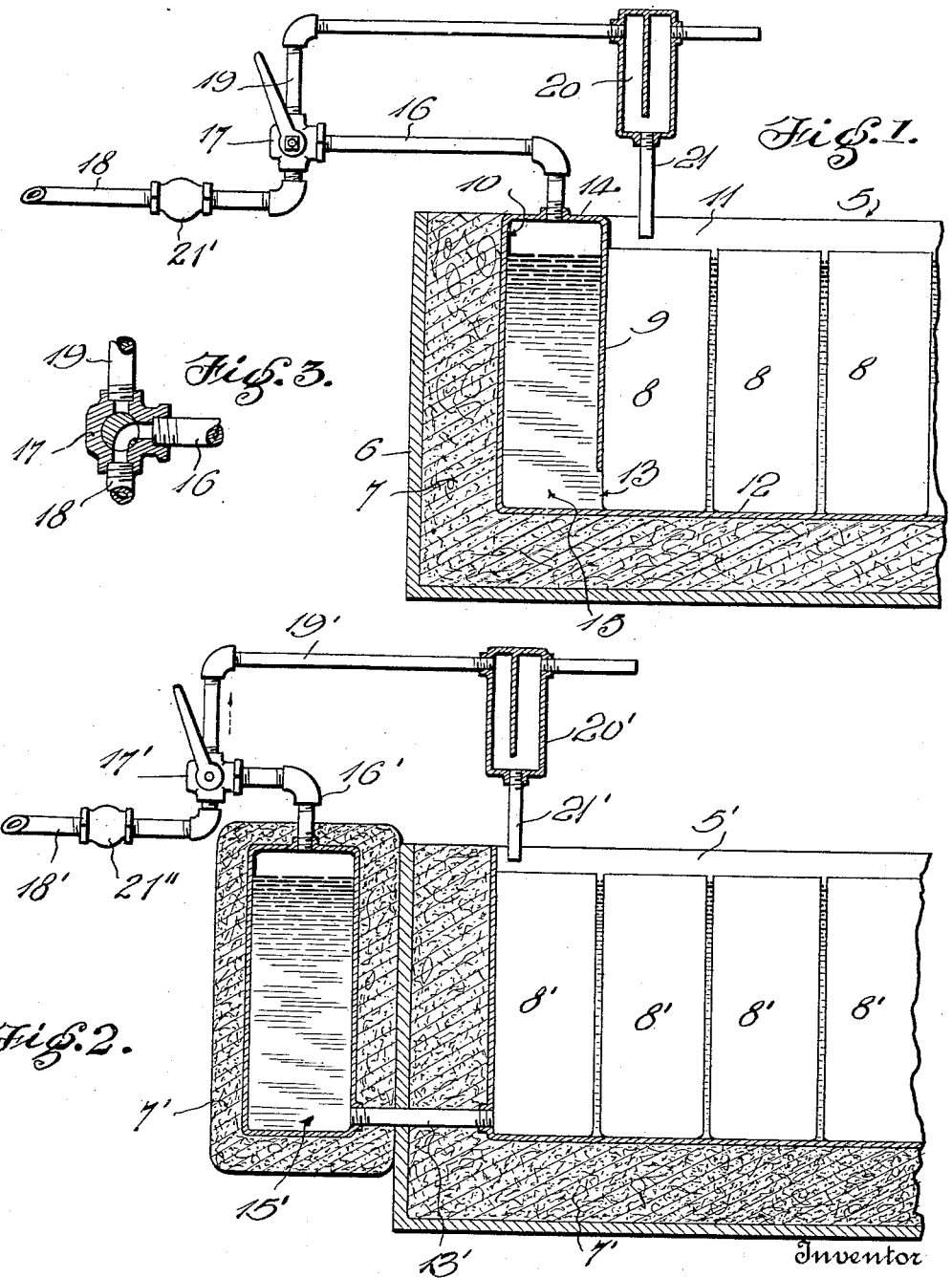

1,884,081

UNITED STATES PATENT OFFICE

GEORGE W. MILLER, OF WASHINGTON, DISTRICT OF COLUMBIA

ICE PLANT

Application filed August 19, 1931. Serial No. 558,111.

The invention relates to ice plants and more particularly to those in which the freezing means embodies a brine tank which receives the usual cans in which blocks of ice are frozen. Removal of a number of the cans of ice from the brine tank, particularly if the latter be comparatively small, causes such lowering of the brine level in the tank as to interfere materially with freezing of the upper ends of the ice blocks in the remaining cans, and it is the principal aim of my invention to make novel provision whereby this difficulty may be overcome in an expeditious manner.

In carrying out the above aim, a further object is to provide for utilizing the compressed air commonly available in an ice plant, for forcing a level-restoring quantity of brine from an auxiliary brine tank into the main brine tank, whenever a sufficient number of cans are removed from the latter to cause objectionable lowering of the brine level therein, the air used to perform this duty being later exhausted to allow said auxiliary tank to receive brine from the main tank when other cans are to be inserted into the latter.

With the foregoing in view, the invention resides in the novel subject matter hereinafter described and claimed, description being accomplished by reference to the accompanying drawing.

Fig. 1 is a fragmentary vertical longitudinal sectional view through a portion of a brine tank embodying the present improvements.

Fig. 2 is a view similar to Fig. 1 but showing a somewhat different construction.

Fig. 3 is a vertical sectional view showing the three-way valve which controls the admission of compressed air to and the exhaust of such air from the auxiliary brine tank.

In Fig. 1 of the drawing, the numeral 5 denotes a brine tank surrounded by the usual shell 6 containing insulating material 7, said tank constituting part of the conventional provision for freezing ice in the cans 8 received therein. Removal and insertion of cans ordinarily changes the entire brine level in the tank 5, but due to my improvement, this is overcome.

A vertical transverse partition 9 is located near one end wall 10 of the tank 5, said partition extending entirely from one of the tank side walls 11 to the opposite side wall. In the present showing, the partition 9 terminates in upwardly spaced relation with the bottom 12 of the tank 5, leaving a slot 13 between said partition and bottom, through which brine may flow. If desired, however, it is obvious that the partition 9 could extend entirely to the bottom 12 and be provided with notches or openings to allow passage of brine from one side of the partition to the other, and vice versa. The opposite ends of the partition 9 are fluid-tightly secured to the side walls of the tank 5, and a top plate 14 is similarly secured to said side walls and to the upper edges of the end wall 10 and partition 9, so that said parts co-operate in forming an auxiliary brine tank 15. A compressed air pipe 16 leads to the upper end of this auxiliary brine tank 15, from a three-way valve 17, an air supply line 18 having a pressure regulating valve 21' leads to said valve 17, and an air exhaust line 19 extends from this valve. The line 19 is provided with a moisture trap 20, and a drain tube 21 depends from said trap and discharges into the tank 5 at such a point that any liquid running from said pipe will not enter any of the ice cans 8.

When the valve 17 is set to place the pipes 16 and 19 in communication with each other, the brine in both tanks 5 and 15 may find the same level, as seen in Fig. 1, this level being such as to effect proper freezing of the ice. When a group of the cans of ice are removed from the tank 5, the brine level in the latter recedes, and as such recession is such as to otherwise interfere with proper freezing of other blocks of ice, the valve 17 is moved to place the pipes 18 and 16 in communication with each other, whereupon compressed air enters the auxiliary tank 15 above the brine, forcing some of this brine through the slot or the like 13 into the main tank 5. By the time the required amount of brine has entered this main tank to restore the required level in the latter, the valve 21' which is set at the proper predetermined pressure, closes, and the pressure in the auxiliary tank 15 will maintain the required level in the tank 5. When other cans 8 are to be inserted into the tank 5, in place of previously removed cans, some of the air is exhausted from the upper end of the auxiliary tank 15, allowing such recession of brine in the tank 5 as to prevent any of the latter from overflowing into the cans 8 upon insertion of the added cans. It will thus be seen that by positioning the valve 17 in one manner, the brine level may be raised in the tank 5, and that by moving the valve to a second position, lowering of the brine level in the tank 5 may be effected. By providing for thus controlling the level of brine, I insure efficient and comparatively rapid freezing of cans remaining in the tank 5, after others have been removed, and insure against any flowing of brine into cans already in the tank upon insertion of other cans into said tank.

In Fig. 2, 5' denotes a brine tank, 8' has reference to the ice cans, and 15' denotes an auxiliary brine tank at the exterior of the tank 5'. The upper end of tank 15' is closed but the lower end of this tank communicates with the tank 5', through an appropriate pipe 13'. Provision is made, identical with that above described, for controlling the admission of compressed air to the tank 15' and exhaust of air from said tank, to control the level of brine in the tank 5', and the parts denoted by the reference characters 16' to 21'' inclusive, may be considered as identical with the parts above described with the use of the reference characters 16 to 21' inclusive.

When the auxiliary tank is at the exterior of the main tank, it is preferably insulated as indicated at 7'.

While features of construction herein disclosed will prove to be adequate for the intended purposes, it is to be understood that within the scope of the invention as claimed, numerous variations may be made.

I claim:—

1. An improvement in an ice plant having conventional provision for freezing cans of water, said freezing provision embodying a main ice-can-receiving brine tank whose entire brine level is changed by insertion and removal of any of the cans; said improvement comprising an auxiliary brine tank into which the surplus of brine flows from the main tank when inserting any number of the cans, and normally idle flow-creating means extraneous to said freezing provision and adapted for operation when removing any of the cans for then returning a level-restoring quantity of brine from the auxiliary tank to the main tank.

2. An improvement in an ice plant having conventional provision for freezing cans of water, said freezing provision embodying a main ice-can-receiving brine tank whose entire brine level is changed by insertion and removal of any of the cans; said improvement comprising an auxiliary brine tank within one end of said main tank and communicating with the latter to allow flow of surplus brine from the main tank into the auxiliary tank when inserting any number of the cans, and normally idle flow-creating means extraneous to said freezing provision and adapted for operation when removing any of the cans for then returning a level-restoring quantity of brine from the auxiliary tank to the main tank.

3. In an ice plant, the combination with a main brine tank and ice cans removable therefrom; of an auxiliary brine tank communicating at its lower end with said main brine tank, said auxiliary tank being closed at its upper end and adapted to contain a quantity of brine to compensate for lowering of the brine level in said main tank caused by removal of cans therefrom, means for admitting a fluid under pressure to said auxiliary tank to force a level-restoring quantity of brine therefrom into said main tank when cans are removed from the latter, and means for relieving the fluid pressure in the upper end of said auxiliary tank when cans are to be inserted into the main tank, the two tanks being related to allow gravitation of the brine from the main tank into the auxiliary tank upon relief of said fluid pressure.

4. In an ice plant, the combination with a main brine tank and ice cans removable therefrom; a partition near one vertical wall of said main tank and extending entirely between two other vertical walls of said tank, a top plate secured to said walls and partition and forming therewith an auxiliary brine tank, the lower portions of the two tanks being in communication, means for admitting a fluid under pressure into said auxiliary tank to drive a level-restoring quantity of brine therefrom into said main tank when cans are removed from the latter, and means for relieving the fluid pressure in the upper end of said auxiliary tank to allow return of brine to the latter when cans are to be inserted into the main tank.

In testimony whereof I affix my signature.

GEORGE W. MILLER.